(12) United States Patent
Taylor

(10) Patent No.: US 12,136,163 B2
(45) Date of Patent: Nov. 5, 2024

(54) PHOTOGRAMMETRY

(71) Applicant: Airbus Defence and Space Limited, Stevenage (GB)

(72) Inventor: Stuart Taylor, Stevenage (GB)

(73) Assignee: Airbus Defence and Space Limited, Stevenage (GB)

(*) Notice: Subject to any disclaimer, the term of this patent is extended or adjusted under 35 U.S.C. 154(b) by 79 days.

(21) Appl. No.: 17/919,773

(22) PCT Filed: May 18, 2021

(86) PCT No.: PCT/GB2021/051189
§ 371 (c)(1),
(2) Date: Oct. 19, 2022

(87) PCT Pub. No.: WO2021/234364
PCT Pub. Date: Nov. 25, 2021

(65) Prior Publication Data
US 2023/0162431 A1    May 25, 2023

(30) Foreign Application Priority Data
May 19, 2020  (GB) .................................. 2007376

(51) Int. Cl.
*G06T 15/08* (2011.01)
*G06T 15/50* (2011.01)

(52) U.S. Cl.
CPC .............. *G06T 15/08* (2013.01); *G06T 15/50* (2013.01)

(58) Field of Classification Search
CPC ................ G06T 15/08; G06T 15/50; G06T 2207/10032; G06T 7/50; G06T 7/97;
(Continued)

(56) References Cited

U.S. PATENT DOCUMENTS 9,547,935 B2    1/2017   Haglund et al.
2015/0049170 A1*  2/2015   Kapadia ................. G06T 17/00
                                                 348/46
(Continued)

FOREIGN PATENT DOCUMENTS

CN    107657660 A    2/2018
CN    110395390 A    11/2019
(Continued)

OTHER PUBLICATIONS

International Search Report dated Jul. 9, 2021; priority document.
(Continued)

*Primary Examiner* — Jeffery A Brier
(74) *Attorney, Agent, or Firm* — Greer, Burns & Crain, Ltd.

(57) ABSTRACT

Measures, including a method, system, and computer program, for performing in-mission photogrammetry while an imaging platform is surveying a target environment. A plurality of images of the target environment are captured by the imaging platform. At the imaging platform, a representative subset of images is identified from the captured plurality of images. The imaging platform transmits the identified representative subset to a processing node. At the processing node, the transmitted representative subset is processed to generate a virtual model of the target environment.

19 Claims, 7 Drawing Sheets

(58) Field of Classification Search
CPC ......... G06T 19/006; G06T 2207/30212; G06T 2207/30232
See application file for complete search history.

(56) References Cited

U.S. PATENT DOCUMENTS

| | | | |
|---|---|---|---|
| 2016/0037356 A1* | 2/2016 | Bathula | H04W 16/18 455/446 |
| 2017/0088072 A1* | 3/2017 | Curtis | G08B 31/00 |
| 2017/0154440 A1* | 6/2017 | Sima | G06T 17/10 |
| 2018/0059247 A1 | 3/2018 | Isaksson et al. | |
| 2019/0362546 A1* | 11/2019 | Wayenberg | G06T 17/20 |
| 2020/0035030 A1 | 1/2020 | Schradin et al. | |
| 2020/0151867 A1 | 5/2020 | Pyznar | |
| 2021/0306614 A1 | 9/2021 | Wiman et al. | |

FOREIGN PATENT DOCUMENTS

| | | |
|---|---|---|
| CN | 110455256 A1 | 11/2019 |
| EP | 2910899 A1 | 8/2015 |
| WO | 2014112911 A1 | 7/2014 |
| WO | 2020040679 A1 | 2/2020 |

OTHER PUBLICATIONS

United Kingdom Search Report dated Nov. 10, 2020; priority document.

* cited by examiner

PHOTOGRAMMETRY

CROSS-REFERENCES TO RELATED APPLICATIONS

This application claims the benefit of the International Application No. PCT/GB2021/051189, filed on May 18, 2021, and of the Great Britain patent application No. 2007376.3 filed on May 19, 2020, the entire disclosures of which are incorporated herein by way of reference.

FIELD OF THE INVENTION

The present disclosure concerns photogrammetry. More particularly, but not exclusively, this disclosure concerns a method, system, and computer program for performing in-mission photogrammetry.

BACKGROUND OF THE INVENTION

Photogrammetry is concerned with the extraction of information (for example, measurements) about a physical object or location from photographic images of the object or location. The object or location which is the subject of the photogrammetry may be referred to as a scene. Thus, it will be appreciated that the scene may be considered to include one or more objects or locations. In particular, methods of photogrammetry are used in the generation of three-dimensional (3D) virtual models of real-world objects and/or locations. Such methods generate a virtual model of a target object or location from a plurality of images of the target object or location. It will be appreciated that these images need not necessarily be a visible light image, and may instead be based on other inputs (for example, infrared imagery, radar data, or other patterns of electromagnetic radiant imagery). The plurality of images typically show the target object or location from a number of dispersed viewpoints to enable an accurate model of the target object or location to be generated from the plurality of images.

One application of such methods of photogrammetry is in military technology, and, in particular, in tools for mission planning. The use of photogrammetry techniques provides military planners with a capability to generate virtual models of target environments in which a military force is to operate. Such a virtual model of a target environment can be evaluated by military planners to inform a mission planning process for a mission in that specific target environment. Thus, photogrammetry methods provide military mission planners with improved awareness and understanding of the target environment.

However, prior art methods of photogrammetry are slow and require extensive manual intervention. For example, in the above described defense technology context, it typically takes a period of time of many hours or days from the collection of imagery of a target environment to the generation of a model of that target environment. Thus, to make use of a virtual model in mission planning or simulation, that mission must typically be planned multiple days in advance. An urgent or short notice mission cannot make use of such a virtual model, as the known methods do not enable the required data to be collected and assembled into a virtual model in adequate time.

The present disclosure seeks to mitigate the above-mentioned problems. Alternatively or additionally, the present disclosure seeks to provide improved methods of performing photogrammetry.

SUMMARY OF THE INVENTION

According to a first aspect of the present disclosure, there is provided a method of performing in-mission photogrammetry, the method comprising, in-mission while an imaging platform is surveying a target environment:
capturing, by the imaging platform, a plurality of images of the target environment;
at the imaging platform, identifying a representative subset of images from the captured plurality of images;
transmitting, by the imaging platform, the identified representative subset to a processing node; and
at the processing node, processing the transmitted representative subset to generate a virtual model of the target environment.

According to a second aspect of the present disclosure there is also provided a system for performing in-mission photogrammetry comprising:
an imaging platform configured to capture a plurality of images of a target environment, identify a representative subset of images from the captured plurality of images, and transmit the identified representative subset to a processing node; and
a processing node configured to process, in-mission while the imaging platform is surveying the target environment, the transmitted representative subset to generate a virtual model of the target environment.

According to a third aspect of the present disclosure, there is also provided a computer program comprising a set of instructions, which, when executed by one or more computerized devices, cause the computerized devices to perform a method of performing in-mission photogrammetry, the method comprising, in-mission while an imaging platform is surveying a target environment:
capturing, by the imaging platform, a plurality of images of the target environment;
at the imaging platform, identifying a representative subset of images from the captured plurality of images;
transmitting, by the imaging platform, the identified representative subset to a processing node; and
at the processing node, processing the transmitted representative subset to generate a virtual model of the target environment.

It will be appreciated that references to a computer program are also intended to encompass a collection of computer programs. For example, a collection of cooperating computer programs intended to be run on geographically dispersed hardware components of a system for performing in-mission photogrammetry.

It will of course be appreciated that features described in relation to one aspect of the present disclosure may be incorporated into other aspects of the disclosure. For example, the method of the present disclosure may incorporate any of the features described with reference to the apparatus of the disclosure and vice versa.

BRIEF DESCRIPTION OF THE DRAWINGS

Embodiments of the present disclosure will now be described by way of example only with reference to the accompanying schematic drawings of which.

DETAILED DESCRIPTION OF THE PREFERRED EMBODIMENTS

Figure 1:
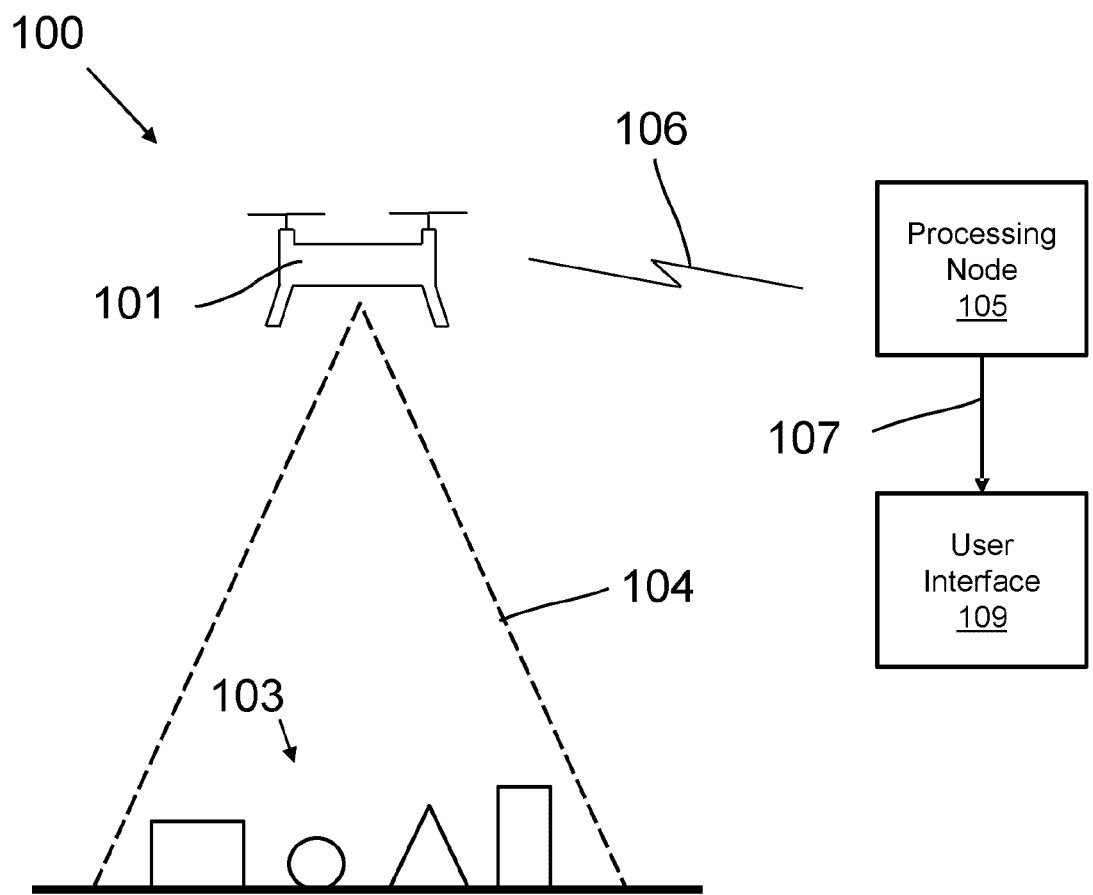
FIG. 1 shows a schematic representation of a system according to embodiments of the present disclosure.

FIG. 1 shows a functional block diagram of a system 100 for performing in-mission photogrammetry according to embodiments of the present disclosure.

System 100 comprises an imaging platform 101. Imaging platform 101 is configured to capture a plurality of images of a target environment 103 for the purpose of generating a three dimensional virtual model of target environment 103. Dashed triangle 104 depicts a field of view of imaging platform 101, encompassing target environment 103.

In embodiments, imaging platform 101 comprises one or more of: an unmanned air system (UAS), a satellite, a manned aircraft, a ground vehicle, and a man-portable camera device. However, it will be appreciated by the skilled person that other platforms comprising imaging equipment are also suitable for use. Suitable UAS include both commercially available drones and military UAS. It will be understood that man-portable, in this context, means that the camera device is so arranged that it may be transported by one or more people without mechanical assistance (either as a single unit or in separate parts).

In embodiments, system 100 comprises a plurality of imaging platforms 101, for example a plurality of drones. It will be appreciated that such a plurality of imaging platforms 101 may comprise individual imaging platforms of different types, for example two drones, a satellite, and a man-portable camera device. Thus, imaging platforms 101 may be aerial, terrestrial, or a mixture of the two.

As is known in the art, in order for the plurality of images to embody sufficient information to enable a three-dimensional (3D) virtual model of target environment 103 to be generated, it is preferable that the plurality of images view target environment 103 from a diverse range of viewing positions, such that the plurality of images collectively capture 360° of imagery of target environment 103. It will be appreciated that, where system 100 comprises a plurality of imaging platforms, the imaging platforms may collectively capture the imagery.

In embodiments, imaging platform 101 is configured to move about target environment 103 in order to capture a suitable plurality of images. In embodiments, imaging platform 101 is configured to move between a plurality of viewing positions for the purpose of capturing suitable imagery. Thus, in embodiments, capturing the plurality of images comprises controlling a movement of imaging platform 101 to capture each of the plurality of images from a respective predetermined viewpoint. In embodiments, capturing the plurality of images comprises controlling an orientation of a sensor carried by imaging platform 101. For example, it may be that the predetermined viewpoints are arranged around target environment 103 at 5-degree intervals. Thus, in such cases, there may be 72 predetermined viewpoints (covering 360 degrees). It will be appreciated that the above number and arrangements of viewpoints are provided as an example and that other numbers and arrangements of viewpoints are also equally possible. In embodiments, moving between the predetermined viewpoints comprises following a pre-planned movement path (for example, flight path). In embodiments comprising a plurality of imaging platforms 101, each of the plurality of imaging platforms 101 may be configured to move through a separate sequence of viewpoints. In embodiments in which system 100 comprises a plurality of imaging platforms 101, the plurality of imaging platforms 101 may each be stationary but dispersed in position so as to capture images of target environment 103 from a suitable selection of viewpoints. It will be appreciated that embodiments may also utilize a combination of the above techniques, for example by use of a combination of stationary and mobile imaging platforms. Thus, in embodiments, system 100 comprises one or more stationary imaging platforms and one or more mobile imaging platforms.

Figure 2:
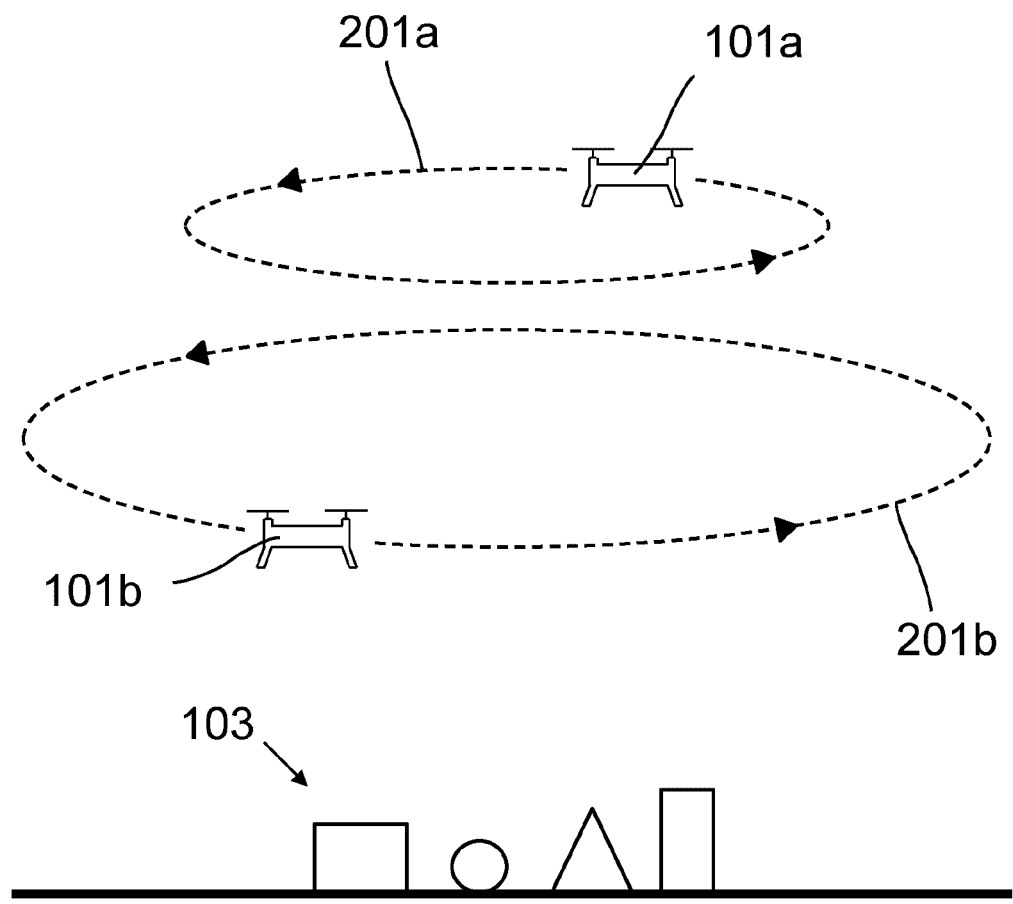
FIG. 2 shows a schematic representation of an image capturing process by an imaging platform according to embodiments of the present disclosure.

FIG. 2 shows a schematic representation of an example image capturing process by image capture platform 101 according to embodiments of the present disclosure. In the illustrated example, imaging platform 101 comprises two drones 101a, 101b. Drones 101a, 101b are each configured to fly respective circular flight paths 201a, 201b arranged such that each drone circles target environment 103 (for example, by flying a circular flight path centered above target environment 103). By traversing their respective flight paths 201a, 201b, the drones 101a, 101b each view target environment 103 from a range of viewpoints. Following circular flight paths 201a, 201b around target environment 103 enables each drone 101a, 101b to capture imagery of target environment 103 from multiple azimuthal angles. In this example, flight path 201a is at a higher altitude than flight path 201b. Therefore, drones 101a, 101b each capture imagery of target environment 103 from a different angle of elevation. For example, flight path 201a may be arranged such that drone 101a captures imagery of target environment 103 from a 60 degree angle of elevation. Meanwhile, flight path 201b may be arranged such that drone 101b captures imagery of target environment 103 from a 30 degree angle of elevation. Capturing imagery of target environment 103 from more than one angle of elevation facilitates photogrammetry, and in particular the construction of a virtual 3D model, based on that imagery.

Figure 3:
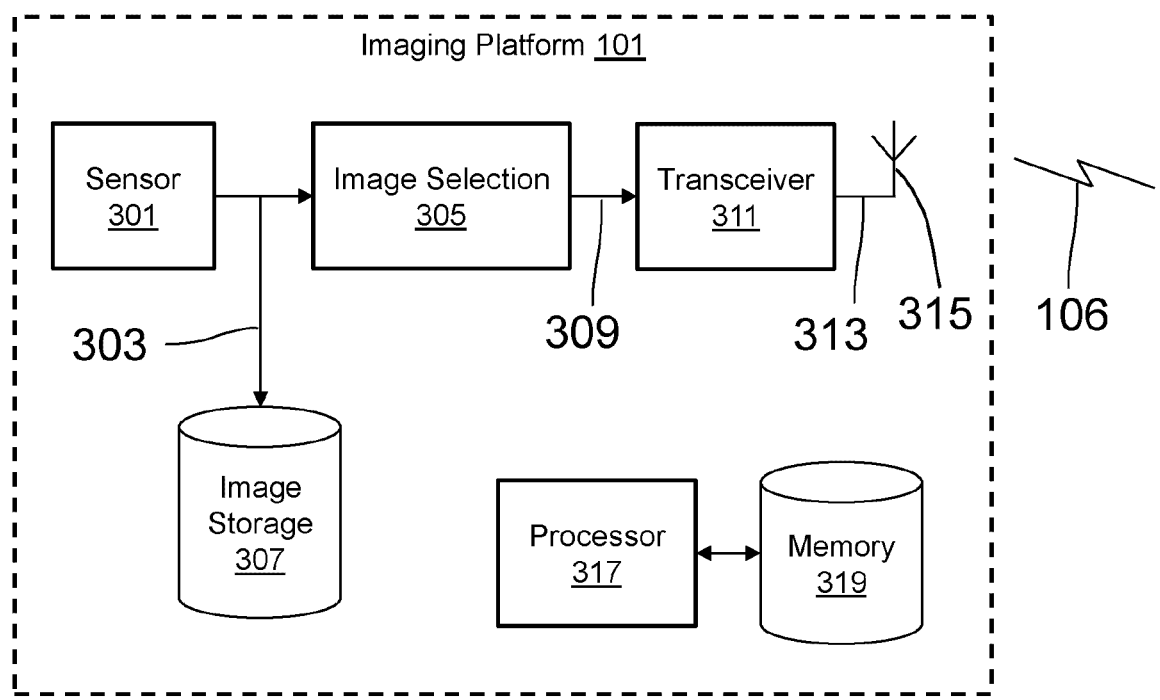
FIG. 3 shows a functional block diagram of an imaging platform according to embodiments of the present disclosure.

FIG. 3 shows a functional block diagram of imaging platform 101. Imaging platform 101 comprises a sensor 301 (or multiple sensors spatially distributed around imaging platform 101). Sensor 301 is configured to capture a plurality of images 303 of target environment 103. In embodiments, plurality of images 303 comprises more than 50 images, preferably more than 75 images, preferably more than 100 images.

It will be appreciated that sensor 301 may comprise any device capable of detecting patterns of electromagnetic radiant imagery to form an image. In embodiments, sensor 301 comprises multiple detectors. In embodiment, the multiple detectors are each capable of detecting different types of electromagnetic radiation. Thus, in embodiments, sensor 301 comprises one or more of a visible light camera, an infrared (IR) camera, imaging radar equipment, and LiDAR equipment. In such embodiments, more than one of the multiple detectors (for example, all of the multiple detectors) may be configured to capture respective images substantially simultaneously. In embodiments, more than one of the multiple detectors (for example, all of the multiple detectors)

are configured to capture respective images at each of the predetermined viewpoints (for example, to capture corresponding visible light and IR images at each of the predetermined viewpoints). Thus, in embodiments, sensor 301 is configured to capture multiple images, wherein the multiple images are each associated with different portions of the electromagnetic spectrum. In embodiments, sensor 301 is configured to capture the multiple images substantially simultaneously.

In embodiments, sensor 301 is configured to capture plurality of images 303 as individual photographs. In embodiments, sensor 301 is configured to capture photographs at predetermined time intervals. In such embodiments, imaging platform 101 may be configured to travel a predetermined flight path at a predetermined speed in order to capture images from appropriate viewpoints. In alternative embodiments, imaging platform 101 is configured to monitor its position and capture images in response to reaching predetermined viewpoints on its flight path. In embodiments, sensor 301 is configured to capture full motion video of target environment 103 and extract individual frames from the captured video. In such cases, the extracted individual frames may together comprise plurality of images 303.

Plurality of images 303 is input into an image selection module 305. In embodiments, captured plurality of images 303 is additionally stored in image storage 307 (for example, for later download from imaging platform 101). In such embodiments, it may be that image selection module 305 is configured to retrieve captured plurality of images 303 from image storage 307. It will be appreciated that image storage 307 may comprise a volatile, or non-volatile, memory. For example, image storage 307 may comprise one or more of RAM, SRAM, ROM, and SDRAM.

Image selection module 305 is configured to identify a representative subset of images 309 from captured plurality of images 303. In embodiments, representative subset 309 comprises a reduced selection of plurality of images 303, the reduced selection having been selected to embody sufficient information on target environment 103 to enable generation of a 3D virtual model of target environment 103. Thus, the identifying may comprise determining a reduced selection of images from captured plurality of images 303 to form representative subset 309 such that captured plurality of images 303 and the representative subset 309 each define a geometry of target environment 103 at a substantially equivalent level of detail. In embodiments, identifying representative subset 309 comprises running an optimization algorithm to reduce information loss. In embodiments, representative subset 309 represents sufficient information from the captured plurality of images 303 to enable generation of a 3D virtual model representing target environment 103. In embodiments, representative subset 309 can be said to represent substantially all of the information contained in captured plurality of images 303. In embodiments, representative subset 309 is selected to represent target environment 103 at a pre-determined level of detail. In embodiments, the pre-determined level of detail is user-configurable. It will be appreciated that representing target environment 103 at an increased level of detail may require that representative subset 309 include a greater number of images compared to that required for a lower level of detail. In embodiments, representative subset 309 comprises between 4 and 50 images, preferably between 8 and 40 images, more preferably between 12 and 30 images.

Figure 6:
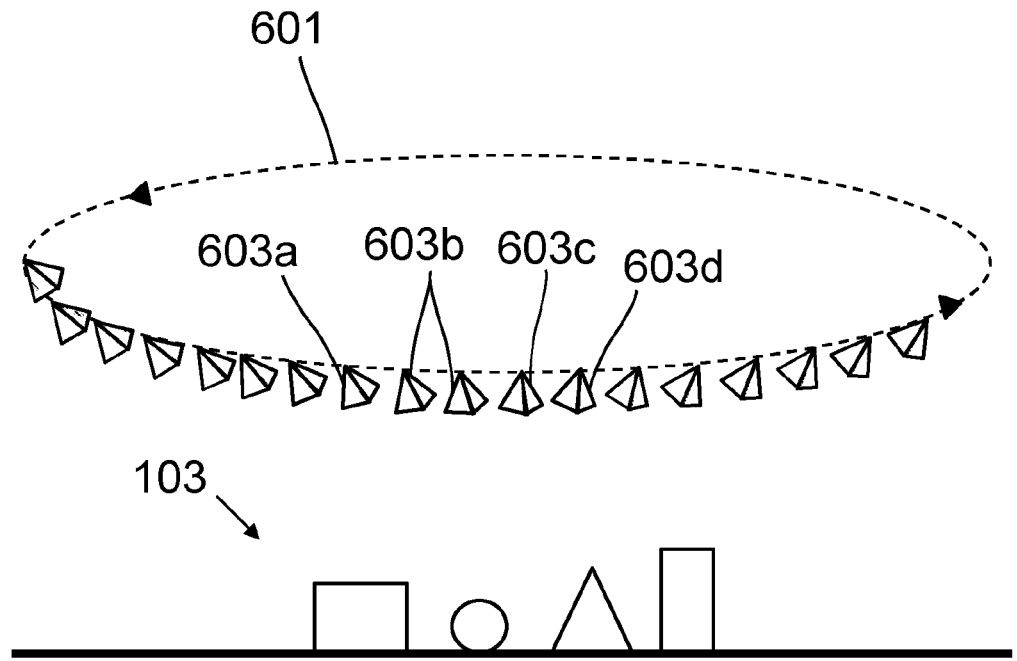
FIG. 6 shows a schematic diagram illustrating an image selection process for identifying a representative subset according to embodiments of the present disclosure.
Figure 7:
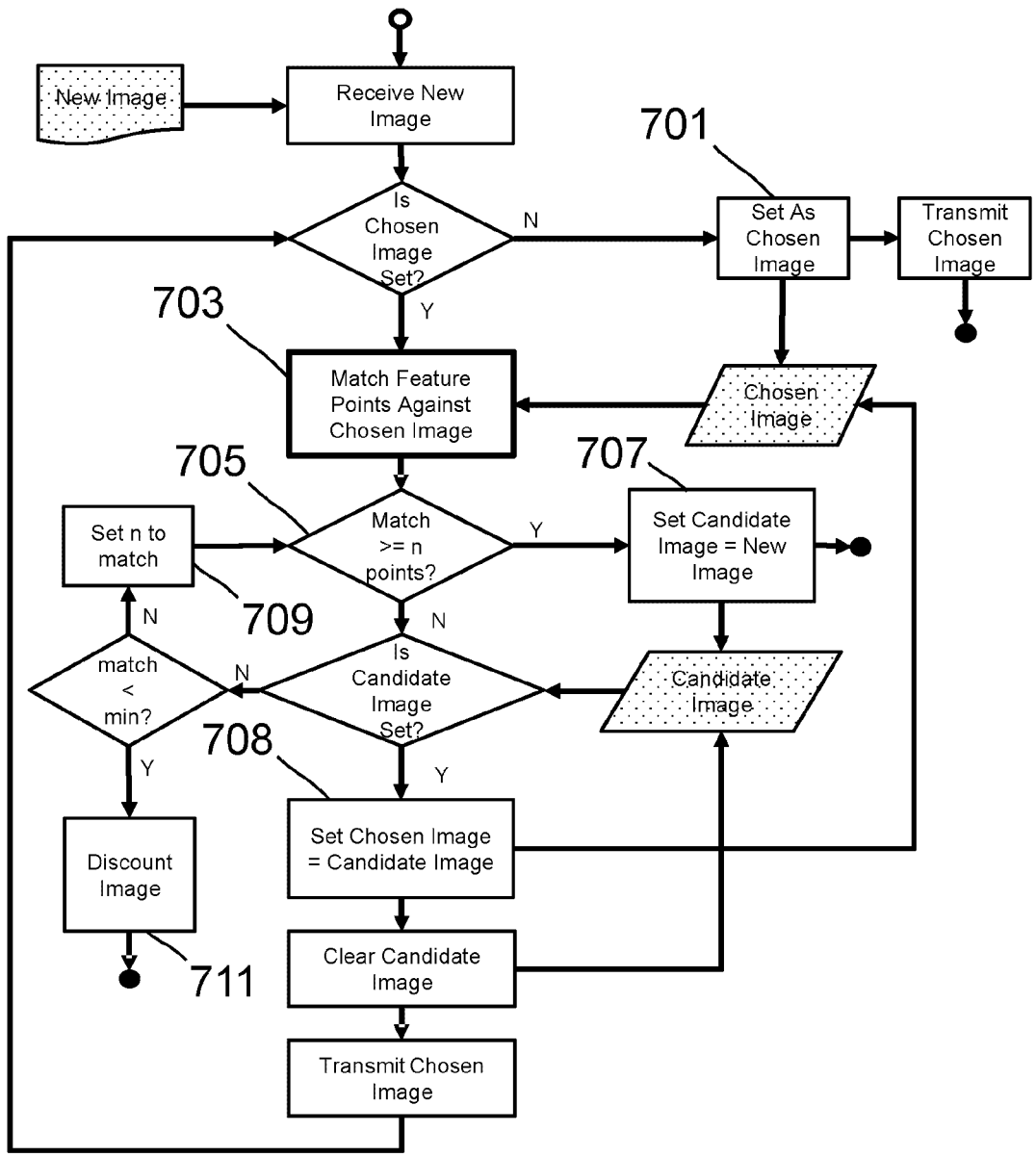
FIG. 7 shows a flow diagram illustrating an image selection process for identifying a representative subset according to embodiments of the present disclosure.

FIGS. 6 and 7 show a schematic diagram and a flow chart illustrating a method for identifying representative subset 309 according to embodiments of the present disclosure. In the illustrated embodiments, imaging platform 101 comprises an aircraft (for example, a commercial drone), configured to follow a substantially circular flight path 601 around target environment 103. In such embodiments, imaging platform 101 is configured to capture images at predetermined time intervals as it follows flight path 601. As it does so, imaging platform 101 captures images from a number of viewpoints 603 (each represented in FIG. 6 by a pyramid denoting the field of view of sensor 301 at the respective viewpoint). Thus, in embodiments, imaging platform 101 is configured to capture plurality of images 303 sequentially (i.e., one after another as it follows flight path 601).

In embodiments, image selection module 305 is configured to select a first image for inclusion in representative subset 309 (item 701 in FIG. 7). Image selection module 305 may, for example, simply select the first captured image in plurality of images 303. An image selected for inclusion in representative subset 309 may be referred to as a "chosen image". In embodiments, image selection module 305 is configured to evaluate subsequent images (referred to as "new" images) by performing feature point matching (item 703 in FIG. 7) between the new image and the most recent chosen image. As imaging platform 101 is configured to capture plurality of images 303 sequentially, it can be assumed that, in plurality of images 303, the most similar images to a given image are those images immediately adjacent to the given image. It will be appreciated that "adjacent", in this context, means the images immediately preceding and following the given image. Thus, it can also be assumed the most recent chosen image is the most similar of the chosen images to a new image under evaluation. This assumption reduces the number of image comparisons required, allowing representative subset 309 to be quickly determined on-board imaging platform 101. Furthermore, evaluating new images by comparison to only the most recent chosen image enables image selection module 305 to begin identifying representative subset 309 before all of plurality of images 303 have been captured.

In embodiments, evaluating a new image may comprise determining whether a number of matched feature points exceeds a predetermined threshold (item 705 in FIG. 7). In embodiments, image selection module 305 is configured to, in response to the number of feature point matches between the new image and the most recent chosen image exceeding the predetermined threshold, select the new image as a candidate image (item 707 in FIG. 7). The process is then repeated for the next new image in the sequence (referred to here as the "second new image"). If the second new image also has a number of matched feature points exceeding the predetermined threshold, the second new image is selected as the candidate image (replacing the previous new image). Thus, the second new image, not the first new image, is now the candidate image. This process repeats until the new image under evaluation has a number of matched feature points which does not exceed the predetermined threshold. At this point, the candidate image (which corresponds to the immediately preceding new image) is flagged as a "chosen image" (item 708 in FIG. 7). It may be that an image having a number of matched feature points not exceeding the predetermined threshold cannot be successfully used in the virtual model generation process. Thus, in embodiments, images having a number of feature point matches exceeding the predetermined threshold, but for which a following image has a number of feature point matches not exceeding the predetermined threshold, are selected for inclusion in representative subset 309 (i.e., are flagged as "chosen images"). In such embodiments, it may be that images having a number of feature point matches exceeding the predetermined threshold, but for which a following image also has a number of feature point matches exceeding the predetermined threshold, are not selected for inclusion in representative subset 309 (i.e., are not flagged as "chosen images"). Thus, those images which are as dissimilar to the most recent chosen image as is allowable by the virtual model generation process (and therefore have greater value to the virtual model generation process) are selected for inclusion in representative subset 309. Those images bearing a close similarity to the last chosen image (and therefore including less new information on target environment 103) are omitted. Thus, image selection module 305 is configured to reduce the number of images to be transmitted in order to generate a virtual model of target environment 103 while maintaining a minimum level of detail in that virtual model.

For example, in the case of the embodiments illustrated by FIG. 6, viewpoint 603a may correspond to the first captured image in plurality of images 303. Thus, it may be that the image associated with viewpoint 603a is selected for inclusion in representative subset 309. The two subsequently captured images 603b, 603c, each yield a number of feature point matches exceeding the predetermined threshold, and thus are each, in turn, selected as the candidate image. Viewpoint 603d is sufficiently far removed from viewpoint 603a that the number of feature point matches in the image associated with viewpoint 603d does not exceed the predetermined threshold. Thus, the current candidate image (i.e., the image associated with viewpoint 603c) is selected for inclusion in representative subset 309 (i.e., is set as a chosen image). The image associated with viewpoint 603c is now the most recent chosen image, and therefore subsequent new images are compared to the image associated with viewpoint 603c, rather than the image associated with viewpoint 603a. Likewise, when the next chosen image is identified, that image will be the most recent chosen image and will then be the subject of the comparison for new images. It will be appreciated that the particular number and selection of images described here is provided as an example and that the number of images selected, and the particular viewpoints associated with those selected images, will depend on a number of factors including the specific target environment 103, the arrangement of the viewpoints 603, and the desired detail of the virtual model to be generated.

In embodiments, image selection module 305 is configured to, in response to there being no candidate image set and the new image not exceeding the predetermined threshold, set the predetermined threshold to the number of identified feature matches between the new image and the most recent chosen image (item 709 in FIG. 7). In such embodiments, image selection module 305 may be configured to set the predetermined threshold to the number of identified feature matches only if the number of identified feature matches exceeds a minimum threshold. It may be that the minimum threshold corresponds to a minimum number of feature matches required by the virtual model generation process. Thus, in embodiments, image selection module 305 is configured to evaluate whether a number of matched feature points between a new image and the most recent chosen image exceeds a minimum threshold. In embodiments, if the number of feature points evaluated is below the minimum threshold, image selection module 305 is configured to discount the new image as an outlier (item 711 in FIG. 7). Thus, in embodiments, image selection module 305 is configured to discount outlier images. Image selection module 305 can therefore be said to be "self-calibrating".

In embodiments, image selection module 305 is configured to identify representative subset 309 at least in part while as sensor 301 is capturing plurality of images 303. Thus, in embodiments, image selection module 305 is configured to operate on a first subset of plurality of images 303 while sensor 301 is still capturing a second subset of plurality of images 303. In such embodiments, image selection module 305 may be configured to operate on the second subset of plurality of image 303 while sensor 301 is still capturing a third subset. It will be appreciated that such embodiments may also include further subsets. In such embodiments, image selection module 305 may be configured to operate on each subset of plurality of images 303 while sensor 301 is still capturing the subsequent subset. In alternative embodiments, image selection module 305 is configured to only begin identifying representative subset 309 once plurality of images 303 have been captured in full.

Imaging platform 101 is further configured to transmit representative subset 309 to a processing node 105. Thus, in embodiments, imaging platform 101 further comprises a transceiver 311. Transceiver 311 is configured to receive representative subset 309 and generate an associated data-stream 313 for the purpose of transmitting representative subset 309 to processing node 105. Thus, in embodiments, transceiver 311 is configured to transmit data-stream 313 to processing node 105. In embodiments, data-stream 313 is generated and transmitted in response to receipt of representative subset 309. In alternative embodiments, data-stream 313 is generated and transmitted in response to receipt of a request for image data from processing node 105. In embodiments, imaging platform 101 is configured to transmit representative subset 309 wirelessly, for example by radio frequency (RF) transmission. In such embodiments, imaging platform 101 may be configured to transmit representative subset via a wireless communications link 106. In embodiments, wireless communications link 106 comprises a radio link. Wireless communications link 106 may, for example, comprise a direct radio link or a satellite communication link. Thus, in embodiments, imaging platform comprises an antenna 315. In such embodiments, transceiver 311 may comprise a radio frequency (RF) transceiver. Antenna 315 is configured to wirelessly transmit data-stream 313 to processing node 105. Alternative embodiments do not include antenna 315, and instead communicate over a wired connection. In such embodiments, communications link 106 may instead comprise a wired communication link. In some embodiments, communications link 106 may comprise a wired link and a wireless link (i.e., communications link 106 may be part-wired and part-wireless).

In embodiments, imaging platform 101 is configured to stream representative subset 309 to processing node 105. In such embodiments, imaging platform 101 may be configured to transmit each of the images in representative subset 309 to processing node 105 as they are identified. In alternative embodiments, imaging platform is configured to transmit representative subset 309 only after image selection module 305 has finished identifying all of representative subset 309.

In embodiments, imaging platform 101 is configured to transmit a first representative subset representing target environment 103 at a relatively low level of detail and later transmit a second representative subset representing target environment 103 at a relatively high level of detail. Such embodiments may enable an initial relatively low resolution virtual model to be generated and made available for use quickly. That virtual model can then be improved once the second representative subset has been transmitted and processed. In such embodiments, the transmission of the second representative subset may comprise only transmitting those images which were not included in the first representative subset.

In embodiments, imaging platform 101 is configured to, once representative subset 309 has been transmitted, transmit the remaining images in plurality of images 303. In such embodiments, imaging platform 101 may transmit only those images identified which have been identified as a candidate image.

Figure 4:
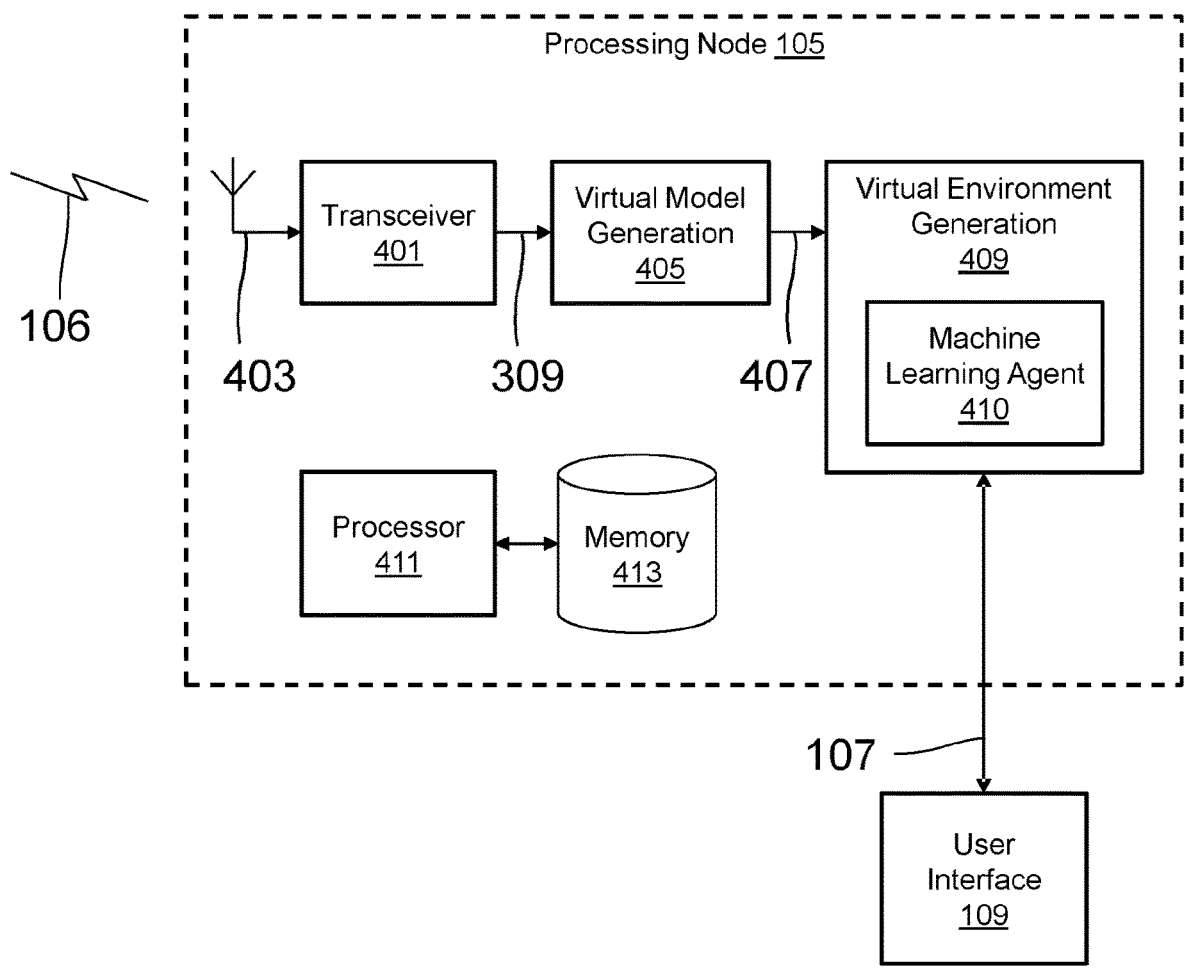
FIG. 4 shows a functional block diagram of a processing node according to embodiments of the present disclosure.

FIG. 4 shows a functional block diagram of processing node 105 according to embodiments of the present disclosure. In embodiments, processing node 105 is located separately from imaging platform 101.

Processing node 105 is configured to receive, from imaging platform 101, representative subset 309. Thus, in embodiments, processing node 105 also comprises a transceiver 401, configured to receive and decode transmitted data-stream 313 to reproduce representative subset 309. In embodiments in which data-stream 313 is transmitted wirelessly, processing node may also comprise an antenna 403.

It will be appreciated that transceiver 311, antenna 315, antenna 403, and transceiver 401 together provide a communications link 106 between imaging platform 101 and processing node 105. In embodiments, communications link 106 comprises a radio link (for example a direct radio link or a satellite communications link).

Military operational theatres often provide only a degraded communications environment. This can be due to jamming by enemy forces or damage to and unavailability of communications infrastructure. It may be the case that an imaging platform 101 according to embodiments of the present disclosure operates in such a degraded communications environment and thus the communications link between imaging platform 101 and processing node 105 may be able to provide only a limited bandwidth. Thus, in embodiments, a bandwidth of the communications link precludes streaming (or transmission) of the full plurality of images 303. In such cases, the intelligent identification of representative subset 309 by image selection module 305 may enable the return of imagery for photogrammetry in situations in which it would otherwise not be feasible.

Processing node 105 further comprises a virtual model generation module 405. Virtual model generation module 405 is configured to process representative subset 309 to generate a virtual model 407 of target environment 103.

In embodiments, virtual model generation module 405 is configured to process the representative subset 309 to produce a three dimensional point cloud. In such embodiments, the three dimensional point cloud may be associated with a geometry of target environment 103. In embodiments, virtual model generation module 405 is configured to, on the basis of the determined point cloud, generate a mesh. In such embodiments, the mesh may represent a geometry of target environment 103. In embodiments, virtual model generation module 405 is configured to apply representative subset 309 to the generated mesh to generate a textured mesh. In such embodiments, it may be that the textured mesh represents target environment 103. Such a textured mesh may therefore be considered to constitute a virtual model 407 of target environment 103.

Such a virtual model 407 can provide military planners with improved understanding and awareness of target environment 103, enabling a more thorough mission planning process. Furthermore, the presently disclosed system 100 enables virtual model 407 to be generated in-mission while imaging platform 101 is still viewing target environment 103. It will be understood that, in this context, "in-mission" refers to an intelligence gathering mission by imaging platform 101. System 100 enables in-mission photogrammetry by providing an end-to-end automated system for the collection and processing of surveillance imagery to generate virtual model 407 of target environment 103. Additionally, system 100 is specifically adapted to expedite the generation of such a virtual model to enable virtual model 407 to be fully generated within the timeframe of an intelligence gathering mission. The sheer quantity of image data collected during an intelligence gathering mission, in combination with a degraded communications environment in which such systems may operate, requires that known imaging platforms be physically retrieved (and therefore removed from the intelligence gathering mission) in order to download their captured imagery (for example, for intelligence analysis purposes). By contrast, system 100 provides means to identify the pertinent image data (i.e., representative subset 309) for transmission. By transmitting only representative subset 309, the imagery required for generation of virtual model 407 can be retrieved for processing without the need to remove imaging platform 101 from the intelligence gathering mission. Furthermore, by identifying representative subset 309 and subsequently processing only the reduced number of images associated with representative subset 309, the complexity of the model generation process is reduced, which also yields a reduction in the time required to generate virtual model 407. Thus, system 100 enables in-mission photogrammetry in near-real-time while imaging platform 101 is still viewing target environment 103.

In embodiments, processing node 105 further comprises a virtual environment generation module 409. Virtual environment generation module 409 is configured to import virtual model 407 into a virtual environment 107. In embodiments, processing node 105 is configured to generate virtual environment 107 by importing virtual model 407 into a run-time "game" environment (for example, based on the Unity or Virtual Battlespace (VBS) engines). In embodiments, the generation of virtual environment 107 may comprise importing multiple virtual models 407 (for example, representing different parts of target environment 103). In such embodiments, virtual environment generation module 409 may be configured to merge the multiple virtual models 407 to form a single combined virtual landscape.

It will be appreciated that virtual model 407 may define a geometry of target environment 103 using relative dimensions. In such embodiments, it may be that virtual model 407 does not contain any information on the real-world dimensions of objects in virtual model 407. Thus, virtual model 407 may define dimensions of objects within target environment 103 only in respect of their relationship to other objects within target environment 103, not in respect of the real world size of those objects. In order to ensure that virtual environment 107 accurately represents target environment 103, virtual model 407 may be scaled such that it is an appropriate size compared to any virtual objects to be introduced into virtual environment 107. Thus, in embodiments, virtual environment generation module 409 is configured to determine an appropriate scale of virtual model 407. In such embodiments, the appropriate scale may be determined on the basis of one or more known positions of imaging platform 101 during the capturing of plurality of images 303.

Similarly, virtual model 407 may not contain any information on the real-world geographical position of target environment 103. Virtual model 407 may define the relative positions of objects within target environment 103. Thus, virtual model 407 may define positions of objects within target environment 103 in respect of the other objects within target environment 103, not in respect of the real world positions of those objects. Thus, in embodiments, virtual environment generation module 409 is configured to determine an appropriate position of virtual model 407. In such embodiments, the appropriate position of virtual model 407 may be determined on the basis of one or more known positions of imaging platform 101 during the capturing of plurality of images 303.

Similarly, it may be that virtual model 407 does not contain any information on the orientation of target environment 103. Thus, in embodiments, virtual environment generation module 409 is configured to determine an appropriate orientation of virtual model 407. In such embodiments, the appropriate orientation of virtual model 407 may be determined on the basis of one or more known positions or movements of imaging platform 101 during the capturing of plurality of images 303. Alternatively, it may be that determining the appropriate orientation of virtual model 407 comprises applying a pre-determined rotation (for example, based on known characteristics of virtual model generation module 405).

It will be appreciated that textures applied to the virtual model are derived from the imagery in representative subset 309. Therefore, textures applied to the virtual model will, initially at least, include lighting effects present on target environment 103 at the time that the relevant images were captured. In embodiments, virtual environment generation module 409 is configured to process virtual model 407 to remove lighting effects resulting from lighting conditions during the capturing. In embodiments, virtual environment generation module 409 is configured to apply one or more desired lighting and/or weather effects to virtual model 407. The one or more desired lighting and/or weather effects may be associated with a time of day and/or weather conditions associated with a planned mission to take place in target environment 103. It may be that, before desired lighting effects can be applied, the lighting effects imported with the representative subset 309 should first have been removed.

In embodiments, virtual environment generation module 409 is configured to process virtual model 407 to generate a collision mesh. In such embodiments, the collision mesh may define one or more surfaces of the virtual environment for the purpose of collision detection. Thus, the collision mesh may be considered to define solid surfaces in virtual environment. In embodiments, the collision mesh defines one or more surfaces through which virtual objects in virtual environment 107 should not be able to pass. Thus, it will be understood that collision detection refers to techniques for simulating interaction between virtual objects in virtual environment 107. For example, the collision detection process may determine that the ground of the terrain defined by virtual model 407 provides a surface on which a virtual object should rest or move. Collision detection techniques are well known in the art and will not be discussed further here.

In embodiments, virtual environment generation module 409 is configured to analyze virtual model 407 to identify one or more objects of interest. Example objects of interest include vehicles, people, weapons, structures, and terrain features. In embodiments, virtual environment generation module 409 is configured to identify objects of interest using computer vision techniques. In embodiments, the analysis of virtual model 407 is performed by operating a trained machine-learning agent 410. In embodiments, virtual environment generation module 409 is further configured to, in response to the analysis of virtual model 407 indicating an object of interest, tag the object in virtual environment 107. In embodiments, virtual environment generation module 409 may be configured to represent a tag in virtual environment 107 as a human readable label. In embodiments, virtual environment generation module 409 may be configured to represent a tag in virtual environment 107 using a pre-determined icon (for example, an icon associated with a specific type of the object of interest). In embodiments, virtual environment generation module 409 is configured to tag objects of interest with a ground moving target indicator (GMTI). It will be appreciated that ground moving target indicators may comprise a standard set of icons used to highlight objects of interest.

In embodiments, virtual environment 107 is transmitted to a user interface 109. User interface 109 is configured to present virtual environment 107 to an end user to enable the end user to interact with virtual environment 107.

In embodiments, user interface 109 is configured to enable the end user to move about in and interact with virtual environment 107. In embodiments, the end user can select to "walk" around virtual environment 107 (i.e., to move above virtual environment 107 as if on foot). Alternatively or additionally, the end user may be able to select to "fly" around virtual environment 107 (i.e., to view virtual environment 107 from a bird's eye perspective). User interface 109 therefore enables the end user to explore virtual environment 107 to gain a greater understanding of target environment 103 (for example, for mission planning purposes).

In embodiments, user interface 109 comprises one or more of a virtual reality (VR) or augmented reality (AR) headset, a computer display and user input device (such as a keyboard, mouse, gamepad), and a touchscreen display. Thus, in embodiments, user interface 109 is configured to receive user input from the end user. In embodiments, user interface 109 is configured to enable the end user to provide user input inside virtual environment 107 (for example, by clicking on or otherwise selecting a point of interest within virtual environment 107). In embodiments, user interface 109 is in a separate location to processing node 105. In alternative embodiments, user interface 109 and processing node 105 are in substantially the same location.

In embodiments, user interface 109 is operable to enable an end user to insert one or more virtual objects into virtual environment 107. Examples of virtual objects which may be inserted into virtual environment 107 include virtual people (for example, virtual soldiers), vehicles, and structures. In embodiments, user interface 109 is configured to receive user input indicating a desired virtual object to insert into virtual environment 107. In embodiments, such a user input may be provided by the end user inside virtual environment 107.

In embodiments, the end user interacts with virtual environment 107 by controlling one or more such virtual objects (for example, a virtual person or vehicle) within virtual environment 107. Such an end user controlling a virtual person or vehicle may be referred to as a "player". It will be appreciated that such a player may control the one or more virtual objects from a first person perspective (for example, where the virtual object comprises a virtual person) or a third person perspective. In embodiments, multiple end users can interact with virtual environment 107 simultaneously, for example by controlling respective virtual people or vehicles. Thus, in embodiments, virtual environment 107 is configured to accommodate one or more players. In such embodiments, system 100 may comprise a plurality of user interfaces 109, each of which enable a respective end user to interact with virtual environment 107. In embodiments, the plurality of user interfaces 109 are geographically dispersed and virtual environment 107 is synchronized between all of the dispersed plurality of user interfaces 109.

In embodiments, virtual environment generation module 409 is configured to indicate lines of sight between virtual people within virtual environment 107 (for example, by showing a straight line along the line of sight). In such embodiments, virtual environment generation module 409 may be configured to perform ray casting to determine the lines of sight. In embodiments, virtual environment generation module 409 is configured to indicate whether the determined lines of sight are clear or obstructed (for example, by changing the color of a line representing the line of sight). It will be appreciated that such functionality may assist in a mission planning process.

In embodiments, virtual environment 107 includes one or more virtual markers attached to respective locations within virtual environment 107. In embodiments, the one or more virtual markers are associated with additional information. Such additional information may comprise one or more of a photographic image, video footage, an audio clip, and textual information. It will be appreciated that a single virtual marker may be associated with more than one type of additional information. A virtual marker positioned at a given location in virtual environment 107 may be associated with additional information relating to the corresponding location in target environment 103. Such a virtual marker may, for example, be attached to a representation in virtual environment 107 of a building in target environment 103. In this example, the virtual marker may be associated with photographic imagery or video footage of the associated building. In embodiments, the end user (for example, acting as a player in virtual environment 107) can interact with a virtual marker in order to view the additional information associated with that virtual marker. In embodiments, a tag on an object of interest (for example, as identified by virtual environment generation module 409) can also act as a virtual marker.

In embodiments, each of the images in representative subset 309 comprises a respective timestamp. In such embodiments, the timestamp may indicate a time at which the respective image in representative subset 309 was captured. In embodiments, the generation of virtual model 407 is performed on the basis of the timestamps. For example, it may be that images within representative subset 309 are grouped according to their timestamps. In such embodiments, groups of images may correspond to distinct points in time, such that the groups of images can be considered to reflect target environment 103 at those distinct points in time. In embodiments, representative subset 309 is selected such that each of the groups of images contains sufficient information to generate a respective virtual model of target environment 103. It will be appreciated that, in such cases, the virtual models will each correspond to a respective one of the distinct points in time. The multiple virtual models can each be considered to represent a state of virtual model 407, such that virtual model 407 comprises a plurality of states. It will be appreciated that, in such cases, each of the plurality of states corresponds to one of the distinct points in time. Thus, in embodiments, virtual model 407 represents target environment 103 at distinct (different) points in time.

In embodiments, user interface 109 is configured to receive user input (for example, within virtual environment 107) indicating a desired one of the points in time. In such embodiments, user interface 109 may be configured to, in response to the receipt of the user input, present virtual model 407 such that it represents the indicated point in time. Thus, virtual model 407 may represent a changing target environment 103 over a period of time. In embodiments, the end user can cycle through the points in time represented by virtual model 407 to evaluate changes in target environment 103 over time. It will be appreciated that such functionality may be of particular use in intelligence gathering missions comprising damage assessment. Similarly, such functionality may enable virtual model 407 to show the movement of objects (for example, vehicles) over time. In embodiments, presenting virtual model 407 to represent the indicated point in time comprises updating virtual environment 107 to use the virtual model associated with the indicated point in time. Thus, presenting virtual model 407 to represent the indicated point in time comprises updating virtual environment 107 to present a state of virtual model 407 associated with the indicated point in time.

Use of virtual environment 107 offers further improved awareness and understanding of target environment 103 (for example, for mission planning purposes). In addition, in embodiments, virtual environment 107 and user interfaces 109 are configured to enable a player in virtual environment to engage in simulated combat. Thus, in embodiments comprising a plurality of user interfaces 109, virtual environment 107 and user interfaces 109 may be configured so as to enable multiple players to "wargame" inside virtual environment 107. Thus, in embodiments, virtual environment 107 also provides a synthetic training environment. Such embodiments may be said to provide a warfighting simulation. In embodiments, virtual environment 107 is configured to provide one or more computer controlled virtual persons (known as "bots") to supplement the one or more human players in the warfighting simulation (for example, as either allied or enemy soldiers).

In embodiments, user interface 109 is configured to facilitate user input by the end user indicating a desired alteration to or improvement of virtual model 407. Such user input can be considered to constitute a request for an alteration to virtual model 407. In embodiments, the request comprises a request for an increase in the resolution of virtual model 407 (or of a part of virtual model 407). It will be appreciated that an increase in the resolution of virtual model 407 may comprise an increase in the level of detail represented by virtual model 407. Alternatively or additionally, the request may comprise a request for an extension of virtual model 407 to include an adjacent further target environment. In embodiments, the request may comprise a request for a change to virtual model 407 such that it represents a more up-to-date state of target environment 103 (i.e., an update to virtual model 407 such that it also represents target environment 103 at an additional point in time). In such embodiments, user interface 109 may be configured to transmit the request to processing node 105. Thus, in embodiments, processing node 105 is configured to receive a request for refinement of virtual model 407. In embodiments, user interface 109 is configured to transmit the request in response to receipt of user input indicating a desired refinement of virtual model 407. In such embodiments, the user input may be provided within virtual environment 407 by the end user (for example, via user interface 109).

In embodiments, processing node 105 is further configured to, in response to receipt of the request, transmit an instruction to imaging platform 101 to capture additional imagery to fulfil the request. In embodiments, processing node 105 is configured to transmit the instruction directly to imaging platform 101. In alternative embodiments, processing node 105 is configured to transmit the instruction to an imaging platform control node, which may in turn transmit one or more commands to imaging platform 101 to perform the capturing of the additional imagery. In embodiments, imaging platform 101 may be configured to analyze previously captured imagery (for example, imagery not included in representative subset 309) to identify further images to fulfil the request. In such embodiments, it may be that the further images comprise one or more images in the captured plurality of images 303 not included representative subset 309. In such embodiments, imaging platform 101 may fulfil the request without the need to capture additional imagery in response to receipt of the request. In embodiments, imaging platform 101 is configured to, in response to receipt of the instruction capture a further plurality of images (for example, of target environment 103 or of an adjacent further target environment) in order to fulfil the request. In embodiments, imaging platform 101 is configured to select, from the further plurality of images, a further representative subset and to transmit the further representative subset to processing node 105. In embodiments, processing node 105 is configured to process the further representative subset as described above in order to enhance virtual model 407 to fulfil the request. It will be appreciated that the ability to request updates to virtual model 407 and to have those updates processed and returned in near-real-time is possible due to the capability, provided by the system of the present disclosure, to perform in-mission photogrammetry while imaging platform 101 is still viewing target environment 103.

Figure 5:
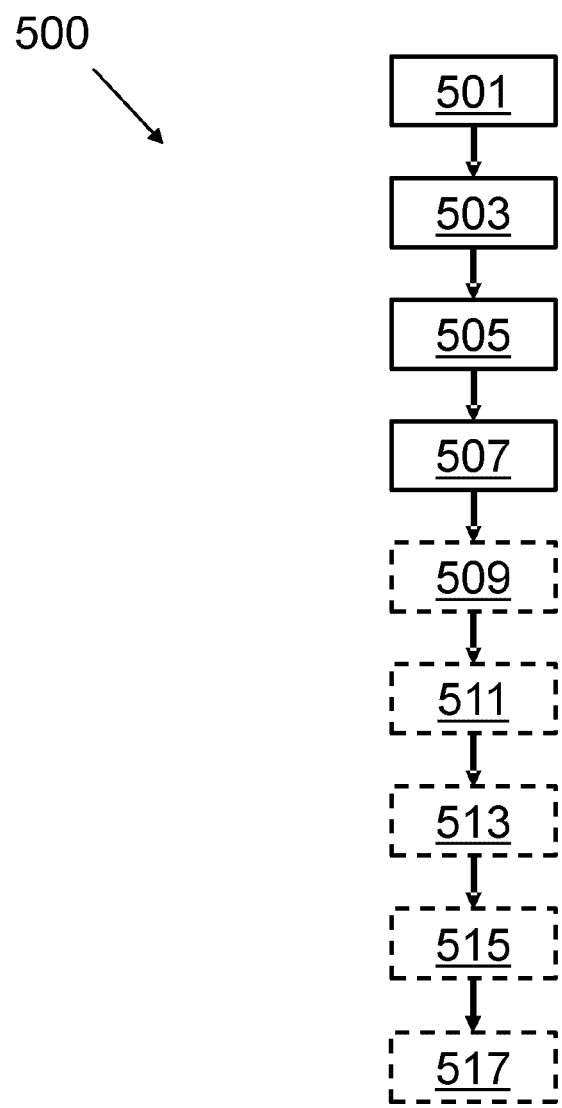
FIG. 5 shows a flow chart illustrating the steps of a method according to embodiments of the present disclosure.

FIG. 5 shows a flow chart illustrating the steps of a method 500 of performing in-mission photogrammetry according to embodiments of the present disclosure. Each of the following steps of method 500 are performed in-mission while an imaging platform is surveying a target environment. In embodiments, the imaging platform comprises one or more of: a drone, a satellite, an aircraft, and a man-portable camera device.

A first step of method 500, represented by item 501, comprises capturing, by the imaging platform, a plurality of images of the target environment. In embodiments, the capturing comprises controlling a movement of the imaging platform to capture each of the plurality of images from a respective predetermined viewpoint.

A second step of method 500, represented by item 503, comprises, at the imaging platform, identifying a representative subset of images from the captured plurality of images. In embodiments, the identifying comprises running an optimization algorithm to reduce information loss. In embodiments, the identifying is performed at least partially contemporaneously with the capturing.

A third step of method 500 represented by item 505, comprises transmitting, by the imaging platform, the identified representative subset to a processing node. In embodiments, the transmitting comprises streaming the identified representative subset over a communications link. In such embodiments, it may be that a bandwidth of the communications link precludes streaming of the full captured plurality of images (for example, it may be that the full captured plurality of images cannot be transmitted within the timeframe of the intelligence gathering mission).

A fourth step of method 500 represented by item 507, comprises, at the processing node, processing the transmitted representative subset to generate a virtual model of the target environment. In embodiments, the processing comprises processing the transmitted representative subset of images to produce a three-dimensional point cloud associated with a geometry of the target environment. In such embodiments, the processing may comprise, on the basis of the determined point cloud, generating a mesh representing a geometry of the target environment. The processing may further comprise applying the representative subset to the generated mesh to generate a textured mesh representing the target environment.

An optional fifth step of method 500, represented by item 509, comprises receiving, at the processing node, a request for refinement of the virtual model. In embodiments, the request comprises a request for an increase in the resolution of the model. Alternatively or additionally, the request may comprise a request for an extension of the virtual model to include an adjacent further target environment. In embodiments, the request is transmitted in response to receipt of user input indicating a desired refinement of the virtual model.

An optional sixth step of method 500, represented by item 511, comprises, in response to receipt of the request, transmitting an instruction to the imaging platform to capture additional imagery to fulfil the request.

An optional seventh step of method 500, represented by item 513, comprises importing the generated virtual model into a virtual environment. In such embodiments, it may be that the user input indicating a desired refinement of the virtual model is provided within the virtual environment by an end user. In embodiments, the importing comprises determining an appropriate position, orientation, and scale of the virtual model. In embodiments, the importing comprises processing the virtual model to remove lighting effects resulting from lighting conditions during the capturing. The importing may further comprise applying one or more desired lighting and/or weather effects to the virtual model. In embodiments, the importing comprises processing the virtual model to generate a collision mesh, the collision mesh defining one or more surfaces of the virtual environment for the purpose of collision detection. In embodiments, analyzing the generated virtual model to identify one or more objects of interest in the virtual model. In such embodiments, the importing may further comprise, in response to the analyzing indicating an object of interest, tagging the object in the virtual environment.

An optional eighth step of method 500, represented by item 515, comprises presenting the virtual environment to the end user to enable the end user to interact with the virtual environment.

In embodiments, the representative subset of images comprises respective timestamps. It may be that the generation is performed on the basis of the timestamps, such that the virtual model represents the target environment at distinct points in time. In such embodiments, it may be that an optional ninth step of method 500, represented by item 517, comprises receiving user input from the end user, the user input indicating a desired one of the points in time, and, in response to the receipt of the user input, presenting the virtual model such that it represents the indicated point in time. It may be that the presenting comprises updating the virtual environment to use the model associated with the indicated point in time.

While the present disclosure has been described and illustrated with reference to particular embodiments, it will be appreciated by those of ordinary skill in the art that the disclosure lends itself to many different variations not specifically illustrated herein. By way of example only, certain possible variations will now be described.

While FIGS. 1 and 2 each illustrate system 100 as comprising two drones to provide imaging platform 101, it will be appreciated that, in other embodiments, imaging platform 101 may comprise a single drone or a greater number of drones. In embodiments, imaging platform 101 may comprise any combination of one or more UAS, one or more satellites, one or more manned aircraft, one or more ground vehicle, and one or more man-portable camera devices.

Similarly, although FIG. 2 illustrates drones 101a, 101b flying concentric circular flight paths 201a, 201b, it will be appreciated that, in other embodiments, drone flight paths 201a, 201b may take other non-circular forms. For example, in embodiments, some or all of plurality of images 303 may be captured by a plurality of manned or unmanned aircraft each performing a single fly-past of target environment 103. In other embodiments, some or all of plurality of images 303 may be captured by one or more people on the ground in or near target environment 103, and thus the path of motion of imaging platform 101 will run along the surface of target environment 103. In the case where imaging platform 101 comprises a satellite, the satellite may follow an orbital path.

While virtual model 407 has been described above as a purely virtual construction, in other embodiments, virtual model 407 may be supplemented by a physical model also representing target environment 103. In such embodiments, user interface 109 may comprise an AR headset. Thus, features of virtual model 407 may be superimposed onto the supplementary physical model. Such embodiments may allow an enhanced training or mission simulation environment compared to prior art techniques in which a rudimentary mock-up of target environment 103 is physically constructed. For example, actual imagery of target environment 103 may be superimposed onto surfaces of the physical mock-up to provide a more realistic training environment.

While in embodiments described above, communication between imaging platform 101 and processing node 105 is wireless, in other embodiments, imaging platform 101 and processing node 105 communicated via a wired communications link. It will be appreciated that, while such embodiments may not suffer from bandwidth limitations caused by a degraded communications environment, the selection of representative subset 309 may nonetheless enable the virtual model 407 to be generated in near-real-time by reducing the processing time required by virtual model generation module 405. In other embodiments, the communications link between imaging platform 101 and processing node 105 is implemented by a combination of wired and wireless links.

It will be appreciated that imaging platform 101, processing node 105, and user interface 109 may each comprise one or more processors and/or memory. Thus, in embodiments, imaging platform 101 comprises a processor 317 and associated memory 319. Processor 317 and associated memory 319 may be configured to perform one or more of the above-described functions of imaging platform 101. Similarly, in embodiments, processing node 105 comprises a processor 411 and associated memory 413. Processor 411 and associated memory 413 may be configured to perform one or more of the above-described functions of processing node 105. Each device, module, component, machine or function as described in relation to any of the examples described herein (for example, sensor 301, image selection module 305, or virtual model generation module 405) may similarly comprise a processor or may be comprised in apparatus comprising a processor. One or more aspects of the embodiments described herein comprise processes performed by apparatus. In some examples, the apparatus comprises one or more processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also include computer programs, particularly computer programs on or in a carrier, adapted for putting the above-described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The one or more processors of imaging platform 101, processing node 105, or user interface 109 may comprise a central processing unit (CPU). The one or more processors may comprise a graphics processing unit (GPU). The one or more processors may comprise one or more of a field programmable gate array (FPGA), a programmable logic device (PLD), or a complex programmable logic device (CPLD). The one or more processors may comprise an application specific integrated circuit (ASIC). It will be appreciated by the skilled person that many other types of device, in addition to the examples provided, may be used to provide the one or more processors. The one or more processors may comprise multiple co-located processors or multiple disparately located processors. Operations performed by the one or more processors may be carried out by one or more of hardware, firmware, and software.

The one or more processors may comprise data storage. The data storage may comprise one or both of volatile and non-volatile memory. The data storage may comprise one or more of random access memory (RAM), read-only memory (ROM), a magnetic or optical disk and disk drive, or a solid-state drive (SSD). It will be appreciated by the skilled person that many other types of memory, in addition to the examples provided, may also be used. It will be appreciated by a person skilled in the art that the one or more processors may each comprise more, fewer and/or different components from those described.

The techniques described herein may be implemented in software or hardware, or may be implemented using a combination of software and hardware. They may include configuring an apparatus to carry out and/or support any or all of techniques described herein. Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. The carrier may comprise a computer readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips.

Thus, embodiments of the present disclosure also provide a computer program comprising a set of instructions, which, when executed by one or more computerized devices (for example, imaging platform 101, processing node 105, and user interface 109), cause the computerized devices to perform a method of performing in-mission photogrammetry. The method comprises capturing, by an imaging platform, a plurality of images of a target environment; at the imaging platform, identifying a representative subset of images from the captured plurality of images; transmitting, by the imaging platform, the identified representative subset to a processing node; and, at the processing node, processing the transmitted representative subset to generate a virtual model of the target environment. In embodiments, each step of the method is performed in-mission while the imaging platform is surveying the target environment.

Embodiments of the present disclosure also provide a method of performing in-mission photogrammetry, the method comprising, in-mission while an imaging platform is surveying a target environment: capturing, by the imaging platform, a plurality of images of the target environment; transmitting, by the imaging platform, the captured plurality of images to a processing node; and, at the processing node, processing the transmitted plurality of images to generate a virtual model of the target environment.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, while of possible benefit in some embodiments of the disclosure, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of performing in-mission photogrammetry, the method comprising, in-mission while an imaging platform is surveying a target environment:
    capturing, by the imaging platform, a plurality of images of the target environment;
    at the imaging platform, identifying a representative subset of images from the captured plurality of images;
    transmitting, by the imaging platform, the identified representative subset to a processing node;
    at the processing node, processing the transmitted representative subset to generate a virtual model of the target environment;
    receiving, at the processing node, a request for refinement of the virtual model; and
    in response to receipt of the request, transmitting an instruction to the imaging platform to capture additional imagery to fulfil the request.

2. A method according to claim 1, wherein the transmitting comprises streaming the identified representative subset over a communications link, wherein a bandwidth of the communications link precludes streaming of the full captured plurality of images.

3. A method according to claim 1, wherein the request comprises a request for an increase in a resolution of the virtual model.

4. A method according to claim 1, wherein the request comprises a request for an extension of the virtual model to include an adjacent further target environment.

5. A method according to claim 1, wherein the request is transmitted in response to receipt of user input indicating a desired refinement of the virtual model.

6. A method according to claim 5, further comprising:
    importing the generated virtual model into a virtual environment; and
    presenting the virtual environment to an end user to enable the end user to interact with the virtual environment, wherein the user input is provided within the virtual environment by the end user.

7. A method according to claim 1, further comprising:
    importing the generated virtual model into a virtual environment; and
    presenting the virtual environment to an end user to enable the end user to interact with the virtual environment.

8. A method according to claim 7, wherein the importing comprises processing the virtual model to remove lighting effects resulting from lighting conditions during the capturing.

9. A method according to claim 8, wherein the importing comprises applying one or more desired lighting and/or weather effects to the virtual model.

10. A method according to claim 7, wherein the importing comprises processing the virtual model to generate a collision mesh, the collision mesh defining one or more surfaces of the virtual environment for collision detection.

11. A method according to claim 7, wherein the importing comprises:
    analyzing the generated virtual model to identify one or more objects of interest in the virtual model; and
    in response to the analyzing indicating an object of interest, tagging the object in the virtual environment.

12. A method according to claim 1, wherein the identifying comprises running an optimization algorithm to reduce information loss.

13. A method according to claim 1, wherein the identifying is performed at least partially contemporaneously with the capturing.

14. A method according to claim 1, wherein the processing comprises:
    processing the transmitted representative subset of images to produce a three dimensional point cloud associated with a geometry of the target environment;
    based on the produced point cloud, generating a mesh representing a geometry of the target environment; and
    applying the representative subset to the generated mesh to generate a textured mesh representing the target environment.

15. A method according to claim 1, wherein:
the representative subset of images comprises respective timestamps;
the generation is performed based on the timestamps, such that the virtual model represents the target environment at multiple distinct points in time.

16. A method according to claim 15, comprising:
receiving time indication user input from an end user, the time indication user input indicating a desired one of the points in time; and
in response to the receipt of the time indication user input, presenting the virtual model such that it represents the indicated point in time.

17. A method according to claim 16, further comprising:
importing the generated virtual model into a virtual environment;
presenting the virtual environment to an end user to enable the end user to interact with the virtual environment; and
updating the virtual environment to use the virtual model associated with the indicated point in time.

18. A system for performing in-mission photogrammetry comprising:
an imaging platform configured to capture a plurality of images of a target environment, identify a representative subset of images from the captured plurality of images, and transmit the identified representative subset to a processing node; and
a processing node configured to process, in-mission while the imaging platform is surveying the target environment, the transmitted representative subset to generate a virtual model of the target environment, to receive a request for refinement of the virtual model, and, in response to receipt of the request, to transmits an instruction to the imaging platform to capture additional imagery to fulfil the request.

19. A non-transitory computer readable medium comprising a set of instructions, which, when executed by one or more computerized devices, cause the computerized devices to perform a method of performing in-mission photogrammetry, the method comprising, in-mission while an imaging platform is surveying a target environment:
capturing, by the imaging platform, a plurality of images of the target environment;
at the imaging platform, identifying a representative subset of images from the captured plurality of images;
transmitting, by the imaging platform, the identified representative subset to a processing node;
at the processing node, processing the transmitted representative subset to generate a virtual model of the target environment;
receiving, at the processing node, a request for refinement of the virtual model; and
in response to receipt of the request, transmitting an instruction to the imaging platform to capture additional imagery to fulfil the request.

* * * * *